Aug. 14, 1923.
J. F. O'CONNOR
1,464,725
FRICTION SHOCK ABSORBING MECHANISM
Filed Nov. 13, 1922
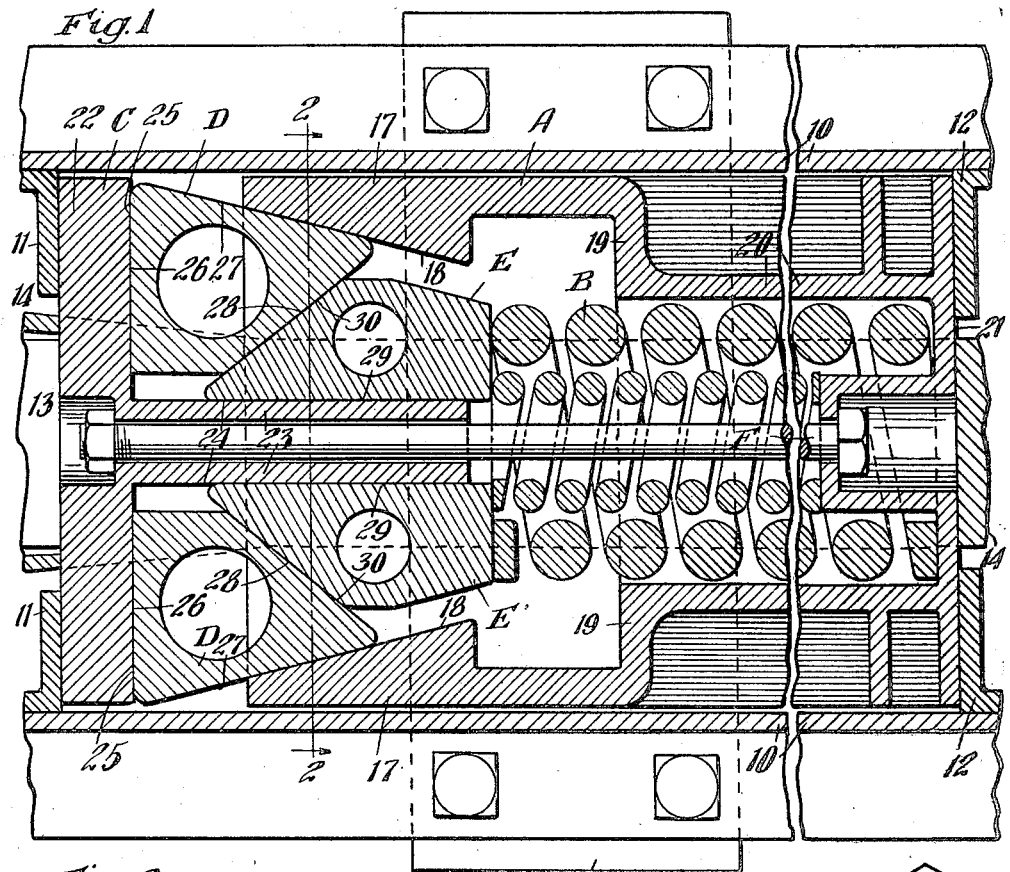
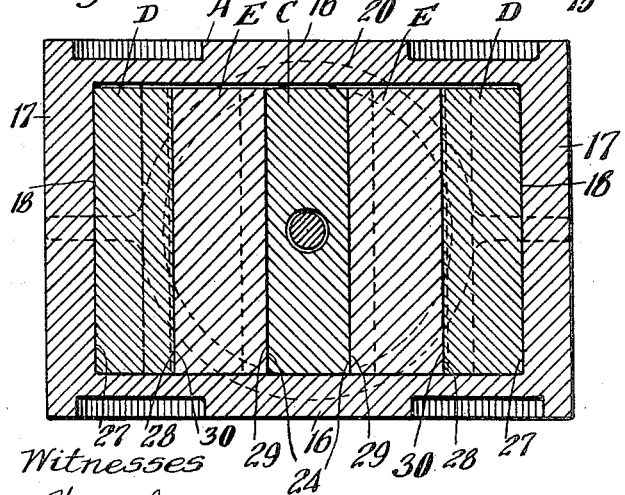
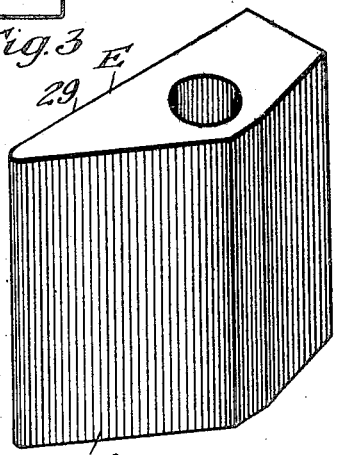
Witnesses
Wm. Geiger
Inventor
John F. O'Connor
By Geo. J. Haight
his Atty.

Patented Aug. 14, 1923.

1,464,725

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed November 13, 1922. Serial No. 600,561.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially designed for railway draft riggings and wherein is also insured easy and certain release.

A more specific object of the invention is to provide a mechanism of the character indicated having a system of friction elements and pressure-transmitting follower so related as to obtain a large proportion of the friction generated on portions of the follower.

Other objects of the invention will more clearly appear from the description and claim appearing hereinafter.

In the drawing forming a part of this specification, Figure 1 is a longitudinal horizontal sectional view of a portion of a railway draft rigging showing my improvements in connection therewith, parts being broken away in order to better accommodate the figure on the sheet. Figure 2 is a vertical transverse sectional view of the shock absorbing mechanism proper corresponding to the line 2—2 of Figure 1. And Figure 3 is a detail perspective of one of the friction generating elements.

In said drawing, 10—10 denote channel draft sills of a car underframe, to the inner faces of which are secured front stop lugs 11 and rear stop lugs 12. A portion of a drawbar is indicated at 13, the same being operatively associated with a hooded cast yoke 14 within which is disposed the shock absorbing mechanism proper. The yoke and mechanism therewithin are supported in operative position by a detachable saddle plate 15. The improved shock absorbing mechanism proper, as shown, comprises a combined friction shell and spring cage casting A; a spring resistance B; a special follower C; a pair of outer wedge-friction elements D—D; a pair of inner wedge-friction elements E—E; and a retainer bolt F.

The casting A is formed at the front or outer end thereof with a friction shell proper of generally rectangular cross section as best indicated in Figure 2, the same having top and bottom walls 16—16 and side walls 17—17. The inner faces of the side walls 17 are provided with inclined friction surfaces 18—18 which are converged inwardly of the shell so as to provide an appreciably tapered mouth. Inwardly of the shell proper, the casting A is necked inwardly as indicated at 19 and thence to the rear end of the casting is formed to provide a spring casing or cage 20. The casting A, at its rear end, has an integral vertical wall 21 laterally extended and suitably reinforced to adapt it to act as the rear follower of the mechanism.

The special follower C consists of an outer transversely extending follower section proper 22 cooperable with the front stop lugs 11 and the drawbar under buff. Integrally formed with the follower section proper 22 is a centrally disposed vertical longitudinally extending arm 23, the latter providing flat friction surfaces 24—24 on opposite sides thereof. The follower section proper 22 also provides transverse flat friction surfaces 25—25 on opposite sides of the arm 23. Between the arm 23 and each side wall of the shell is disposed a set of wedge-friction-shoes D and E. Each wedge-shoe D is in the form of a preferably cast and cored block having a front flat transversely extending friction surface 26, an outer side friction surface 27 extending at the same angle as and cooperable with the shell friction surface 18, and an inner wedge-friction surface 28. Each wedge-shoe E is formed on the side nearest the arm 23 with a longitudinally extending flat friction surface 29 cooperable with the corresponding friction surface 24. At its front end, each member E is formed with a wedge-friction surface 30 cooperable with the opposed wedge-friction surface 28 of the corresponding wedge-shoe D. The normal position of the parts is such that the inner ends of the wedge shoes E project inwardly of the inner end of the arm 23 so that the spring B has bearing upon the inner ends of the wedge-shoes E.

The retainer bolt F is anchored at its rear end within a hollow boss formed integral with the casting A and at its forward end within a suitable recess of the follower C, the arm 23 being longitudinally apertured to accommodate the shank of said bolt F.

The operation of the mechanism during a compression stroke and assuming a buffing action, is as follows. As the follower C is moved toward the shell, the two wedge-friction-shoes D—D are forced to travel longitudinally and as the same slide down the converging friction shell surfaces 18, it is obvious that the shoes D will be moved laterally toward each other, thus generating friction not only on the engaging surfaces 18 and 27 but also on the engaging surfaces 25 and 26. As the wedge-shoes D are moved longitudinally and laterally as above described, the wedge-shoes E are compelled to move longitudinally at a faster rate than the wedge-shoes D or the follower C so that friction is generated between the wedge surfaces 28 and 30 and also between the surfaces 29 of the wedge-shoes E and surfaces 24 of the follower arm 23. It will further be observed that this last described action takes place upon the arm 23 in such manner as to place the latter under tension. From the foregoing, it will be observed that there are no less than eight sets of comparatively large area friction surfaces which are functioning simultaneously so that high capacity is generated while enabling me to maintain relatively blunt angles at all points. In the release action, on account of the comparatively steep pitch of the shell friction surfaces, the entire unit consisting of the special follower C, two wedge-shoes D and two wedge-shoes E, can readily be initially moved outwardly sufficiently to break down the friction between the wedge-shoes D and the shell surfaces, whereupon differential action in an opposite direction will take place under the influence of the spring B acting through the wedge-shoes E.

I have herein shown and described what I now consider the preferred manner of carrying out the invention, but the same is merely illustrative and I contemplate all changes and modifications that come within the scope of the claim appended hereto.

I claim:

In a friction shock absorbing mechanism, the combination with a friction shell; of a spring resistance; a follower having an extension projecting within the shell, the distance between the surfaces of said projection and the corresponding interior opposed surfaces of the shell, progressively decreasing inwardly of the shell; an outer set of friction shoes, each frictionally cooperable with the shell and the follower; and an inner set of friction shoes each frictionally cooperable with one of said friction shoes of the first named set and with the follower extension, each of said friction shoes of the inner set having a flat bearing surface at its inner end, the adjacent end of the spring resistance engaging said bearing surfaces of the friction shoes of the inner set.

In witness that I claim the foregoing I have hereunto subscribed my name this 10th day of October 1922.

JOHN F. O'CONNOR.

Witnesses:
UNA C. GRIGSBY,
H. M. DEAMER.